United States Patent
Da Silva et al.

(10) Patent No.: US 10,570,952 B2
(45) Date of Patent: Feb. 25, 2020

(54) THRUST WASHER

(71) Applicants: Mahle Metal Leve S/A, Jundiaí, SP (BR); Mahle International GmbH, Stuttgart (DE)

(72) Inventors: Adalto Borghi Da Silva, Itatiba (BR); Walter Junior Dias Carlos, Jundiaí (BR); Matheus Dos Santos Ferreira, Jundiaí (BR); Marcos Manoel Valverde Pereira, Sao Paulo (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 0 days.

(21) Appl. No.: 16/329,209

(22) PCT Filed: Aug. 29, 2017

(86) PCT No.: PCT/EP2017/001021
§ 371 (c)(1),
(2) Date: Feb. 27, 2019

(87) PCT Pub. No.: WO2018/041397
PCT Pub. Date: Mar. 8, 2018

(65) Prior Publication Data
US 2019/0186534 A1    Jun. 20, 2019

(30) Foreign Application Priority Data
Aug. 31, 2016    (BR) ...................... 10 2016 020154 3

(51) Int. Cl.
*F16C 17/04*    (2006.01)
*F16C 33/04*    (2006.01)
*F16C 33/10*    (2006.01)

(52) U.S. Cl.
CPC .......... *F16C 17/047* (2013.01); *F16C 33/046* (2013.01); *F16C 33/1075* (2013.01); *F16C 2360/22* (2013.01)

(58) Field of Classification Search
CPC .. F16C 9/02; F16C 9/04; F16C 17/047; F16C 17/107; F16C 33/1065; F16C 33/1075; F16C 2360/22
See application file for complete search history.

(56) References Cited

U.S. PATENT DOCUMENTS 5,192,136 A    3/1993    Thompson et al.
5,520,466 A *  5/1996    Everitt .................... F16C 17/10
                                                              384/124

(Continued)

FOREIGN PATENT DOCUMENTS

DE        3901265 A1 *  7/1990  ................ F16C 9/02
WO    2016/143225 A1    9/2016

*Primary Examiner* — Phillip A Johnson
(74) *Attorney, Agent, or Firm* — Fishman Stewart PLLC

(57) ABSTRACT

A thrust washer for an internal combustion engine may include a body. The body may have a slip surface and a planar contact surface associated with an engine block. The slip surface may have a surface profile the may include at least one ramp section, at least one flat horizontal section, and at least one oil channel. The at least one ramp section and the at least one flat horizontal section may be connected via an asymptotic curve. The at least one ramp section may extend asymptotically toward the at least one flat horizontal section. The at least one ramp section may have an angular length of 45° or less, the at least one flat horizontal section may have an angular length of 45° or less, and the at least one oil channel may have an angular length of 20° or less.

20 Claims, 4 Drawing Sheets

(56) References Cited

U.S. PATENT DOCUMENTS

| | | | | |
|---|---|---|---|---|
| 6,921,210 B2* | 7/2005 | Welch | ................ | F16C 9/02 |
| | | | | 384/123 |
| 6,976,788 B2* | 12/2005 | Honda | ................ | F16C 33/1065 |
| | | | | 384/123 |
| 7,134,793 B2* | 11/2006 | Thompson | ................ | F16C 9/02 |
| | | | | 384/294 |
| 7,354,199 B2* | 4/2008 | Welch | ................ | F16C 9/00 |
| | | | | 384/275 |
| 9,746,023 B2* | 8/2017 | George | ................ | F16C 9/02 |
| 2002/0034349 A1 | 3/2002 | Thompson | | |
| 2002/0094143 A1* | 7/2002 | Yang | ................ | F16C 9/02 |
| | | | | 384/294 |
| 2015/0323001 A1* | 11/2015 | Carter | ................ | F16C 9/02 |
| | | | | 384/291 |

* cited by examiner

THRUST WASHER

CROSS-REFERENCE TO RELATED APPLICATIONS

This application claims priority to International Patent Application No. PCT/EP2017/001021, filed on Aug. 29, 2017, and Brazilian Patent Application No. BR 10 2016 020154 3, filed on Aug. 31, 2016, the contents of both of which are hereby incorporate by reference in their entirety.

TECHNICAL FIELD

This invention relates to a thrust washer for internal combustion engines provided with a body comprising at least one slip surface having a hydrodynamic surface profile.

BACKGROUND

Internal combustion engines are energy conversion mechanisms used by the great majority of motor vehicles and basically comprise two main parts—one or more cylinder heads and the engine block. Below the cylinder head(s) are located the combustion chambers, and the cylinders and the crankshaft assembly are located in the engine block.

The crankshaft is a fundamental component in the functioning of combustion engines, and is responsible for converting the energy generated by combustion of the air/fuel mixture into torque. The crankshaft, which is mounted in the block by supporting bearings, is usually of cast carbon steel and has connecting rods coupled to the crank pins and their geometry is reminiscent of a number of cranks placed side by side.

Among the components which help to mount the crankshaft in the engine block are bushes and thrust washers, the washers being responsible for withstanding axial loads generated by the gearing or transmission system.

Thrust washers are generally located in one or more bearing positions, and basically comprise two half-moons or two washers positioned at the top and, alternately, also at the bottom of the bearing. These washers act in such a way as to withstand possible axial forces transmitted by the crankshaft, so that when they are exposed to an axial load the force generated does not act directly on the engine block because the washer provides a supporting surface for the load, preventing wear on the block.

As may be seen in FIG. 1, the thrust washer is provided with a body, substantially of a semi-circumferential shape, and has two surfaces. The planar contact surface is associated with the engine block, and there is no relative movement between the washer and the block, while the slip surface remains in contact with the crankshaft, resulting in relative movement between the washer and the crankshaft. Depending upon the applied load, the relative movement places a high load on the contact between the slip surface and the crankshaft, the slip surface being responsible for supporting the axial load produced and, additionally, the area where oil channels are present.

The oil channels are fundamental to the proper functioning of thrust washers and ensure that the surface is lubricated, preventing accelerated/excessive wear on the parts in relative movement. These channels are filled with oil so that the oil is distributed over the surface through the pull generated by the rotational movement.

Both Otto and diesel engines are subject to axial loads. Furthermore, these loads are becoming ever greater, mainly in engines provided with automatic or automated transmissions. These transmissions reduce fuel consumption in motor vehicles, but they increase the applied loads, with the result that the thrust washers currently in use cannot withstand the forces and ultimately become worn or suffer other deficiencies.

In order for the washer to support the loads generated, an oil film has to be formed between the slip surface of the washer and the crankshaft. This oil film must maintain a minimum thickness, and it is created through a phenomenon known as hydrodynamic support. This hydrodynamic support depends on two main factors—the shape of the surface and the relative speed between the faces.

In order to achieve sufficient hydrodynamic support, a specific relative speed, and a surface to provide for that condition, have to be guaranteed. As the speed varies as a function of engine rotation, the surface can be modified in such a way as to achieve sufficient support to support high axial loads and forces.

In the state of the art there are flat washers and washers with hydrodynamic profiles, and they may be convex or ramp-and-pad.

Washers having a flat slip surface, as the name suggests, do not have any geometry on the slip surface, and only include oil channels. These washers have low resistance to binding and are only suitable for engines with low loads.

Convex washers comprise a curvilinear slip surface. They have low resistance to binding because of the lack of flat sections. It should be noted that a flat section is essential in order to maintain hydrodynamic support.

Ramp-and-pad washers, meanwhile, comprise at least one ramp with a constant inclination, at least one flat horizontal section and at least one oil channel. These washers ensure a high level of hydrodynamic support as compared to flat or convex washers.

Although ramp-and-pad washers have better performance, the connection between the ramp section and the horizontal section represents a sudden change in geometry. This sudden change point gives rise to an inflection point or vertex reducing hydrodynamic support.

SUMMARY

One way of improving the performance of ramp-and-pad washers is to link the ramp section to the horizontal section by means of an asymptotic transition. In view of the above, there has not yet been developed any thrust washer comprising a hydrodynamic profile in which the ramp section and the flat horizontal section are linked asymptotically, imparting to the washer an increase in the maximum axial load supported, and greater oil film thicknesses, guaranteeing excellent resistance to binding and, consequently, high performance.

The object of this invention is to provide a thrust washer, the washer comprising a body provided with one slip surface, the slip surface comprising at least one ramp section, at least one flat horizontal section, at least one oil channel, and an asymptotic link between the ramp section and the horizontal section.

Another object of this invention is to provide a thrust washer comprising high hydrodynamic support, thereby increasing its resistance to binding, and as a consequence guaranteeing excellent performance, especially in engines working with high loads.

Yet a further object of this invention is to provide a thrust washer in which its dimensional variation has less of an impact on its performance as compared to prior-art washers.

The objects of this invention are accomplished by a thrust washer for internal combustion engines provided with a body comprising a planar contact surface associated with the engine block and a slip surface comprising a surface profile incorporating at least one ramp section, at least one flat horizontal section, and at least one oil channel, the ramp section and the flat horizontal section being connected by means of at least one asymptotic curve, the ramp section tending asymptotically toward the flat horizontal surface, the ramp section comprising a maximum angular length of 45° and a maximum depth of 300 microns, the flat horizontal section comprising a maximum angular length of 45° and the oil channel comprising a maximum angular length of 20° and a maximum depth of 2.5 millimeters, being provided with at least one assembly comprising the ramp section 4 and the flat horizontal section 5, being provided with up to 11 sets of ramp sections 4 and flat horizontal sections 5.

The objects of this invention are also accomplished through an internal combustion engine comprising at least one thrust washer as described above.

BRIEF DESCRIPTION OF THE DRAWINGS

This invention will be described more particularly below on the basis of an embodiment illustrated in the drawings. In the figures.

DETAILED DESCRIPTION

This invention relates to a thrust washer 1 for internal combustion engines provided with a body comprising at least one slip surface 3 having a hydrodynamic profile.

As already mentioned in the state of the art, thrust washers 1 are components which help mount the crankshaft in the block of an internal combustion engine, and are responsible for withstanding axial loads generated by transmission systems.

Figure 1:
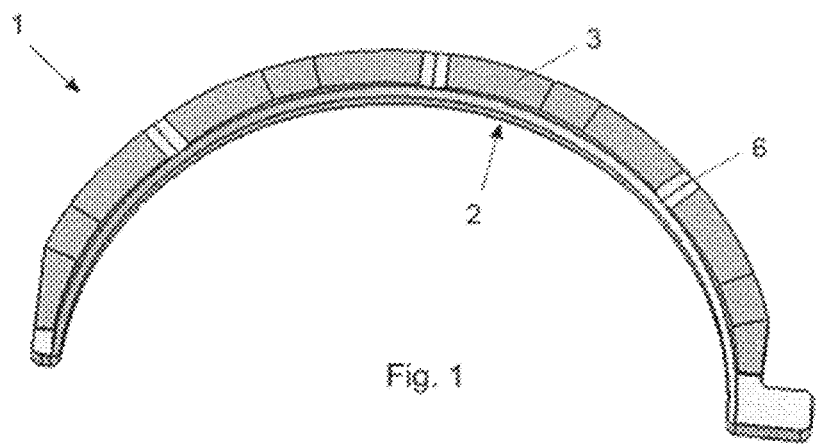
FIG. 1—a perspective view of a thrust washer together with all its constituent parts.

As may be seen in FIG. 1, thrust washer 1 is provided with a body, substantially of semi-circumferential shape, and comprises two surfaces. Contact surface 2 is planar and associated with the engine block, and there is no relative movement between washer 1 and the block, while slip surface 3 remains in contact with the crankshaft, bearing the relative movement between washer 1 and the crankshaft. Depending upon the applied load, the relative movement places a high load on the contact between slip surface 3 and the crankshaft, with slip surface 3 being responsible for supporting the axial load transmitted by the crankshaft. In addition to this, thrust washer 1 comprises at least one oil channel 6 in slip surface 3.

In order for washer 1 to support the loads generated, an oil film must be formed between slip surface 3 of washer 1 and the crankshaft. This oil film must maintain a thickness and is produced by means of a phenomenon known as hydrodynamic support. This hydrodynamic support depends on two factors—the shape of the surface and the rotation speed of the engine.

Washer 1 is said to maintain hydrodynamic support when there is no metal-to-metal contact, i.e. there is a distance between the surfaces, this distance being the thickness of the oil film.

In order that there is sufficient hydrodynamic support, a specific rotation speed has to be ensured, and the best surface possible for this condition also has to be guaranteed. As the rotation speed varies according to the rotation speed of the engine, the surface of the slip surface therefore has to be altered so as to achieve sufficient support to support high loads and axial forces.

Figure 2:
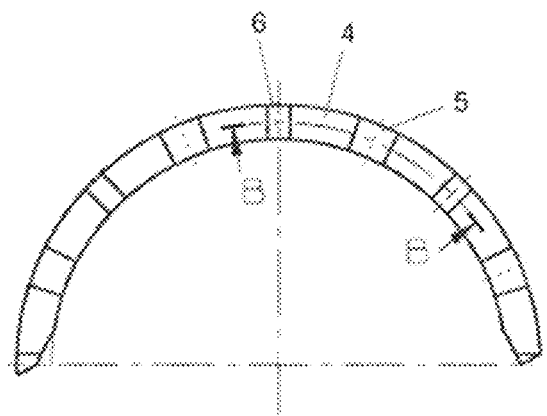
FIG. 2—a front view of the thrust washer according to this invention.
Figure 3:
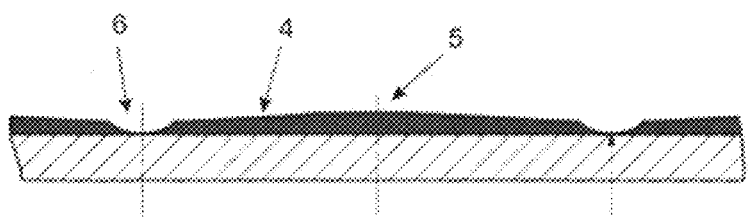
FIG. 3—a detailed view of the cross section B-B in FIG. 2.

In this respect, this invention provides a preferred configuration for thrust washer 1 in FIGS. 2 and 3, comprising a surface profile of slip surface 3 incorporating at least one ramp section 4, at least one flat horizontal section 5 and at least one oil channel 6, ramp section 4 and flat horizontal section 5 being connected by means of an asymptotic curve.

Ramp section 4 starts with the inclination of the curve and tends asymptotically toward flat horizontal section 5. This means that ramp section 4 and flat horizontal section 5 are connected through a constant curve which is smoothly concordant, eliminating possible points of inflection or vertices in the connection, guaranteeing a hydrodynamic surface profile.

As explained previously in the state of the art, the presence of points of inflection or vertices in the connection between ramp section 4 and flat horizontal section 5 results in a limitation of the hydrodynamic support of washer 1. The asymptotic transition from ramp section 4 to flat horizontal section 5 greatly influences the hydrodynamic support of washer 1 such that the smoother this transition is the greater the hydrodynamic support will be.

There are also other factors that guarantee greater hydrodynamic support of washer 1, these including angular length, depth and number of ramp sections 4, and the length and number of flat horizontal sections 5.

In fact, the greater the angular length or the shallower the depth of ramp section 4, the greater the hydrodynamic support generated in washer 1, i.e. the ramp sections 4 produced in the surface profile of washer 1 must include great angular length and minimal depth.

It should, however, be noted that there is a relationship of compromise between angular length and number of ramp sections 4 and the length of flat horizontal section 5, such that the greater the angular length of ramp section 4, the shorter the length of flat horizontal section 5.

As stated previously, flat horizontal section 5 is of utmost importance in terms of better utilization of the hydrodynamic pressure generated by convergent ramp section 4. The absence of this flat horizontal section 5 creates a sudden reduction in the hydrodynamic pressure generated and reduces the load supported by washer 1.

Hence, the relationship between ramp section 4 and flat horizontal section 5 must be such that ramp section 4 comprises a sufficiently great angular length to generate good hydrodynamic support, although this must not be so great as to eliminate flat horizontal section 5 from the surface profile of washer 1.

In addition to the relationship of compromise between the length of ramp section 4 and flat horizontal section 5, there is also a relationship of compromise in terms of the number of assemblies of ramp sections 4 and flat horizontal sections 5 provided in the surface profile of washer 1.

In theory, the greater the number of ramp sections 4 produced in the surface profile of a washer 1, the greater the number of parts of the washer will be used to generate hydrodynamic support and the better will be the lubricant oil supply of each ramp section 4.

Conversely, the greater the number of ramp sections 4, the shorter the angular length and the greater the depth of these ramp sections 4. When ramp sections 4 are very small, the hydrodynamic support of washer 1 drastically drops. Thus, the ideal number of ramp sections 4 for guaranteeing sufficient angular length and depth for each ramp section 4 must be identified.

Another aspect to be taken into consideration is the capacity of washer 1 to support loads in any direction of rotation. In order that washer 1 can support the same load in either direction of rotation, there have to be two symmetric ramp sections 4 in concordance with a flat horizontal section. If there is prior knowledge that the load in one direction of rotation is less than in the other direction, it is possible to produce an asymmetric ramp section 4.

Figure 4:
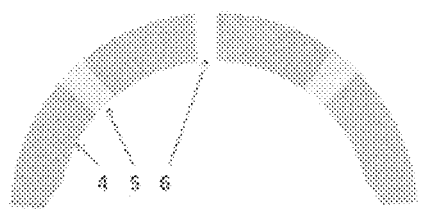
FIG. 4—a front view of the washer of this invention, comprising two assemblies of ramp and flat horizontal sections.
Figure 5:
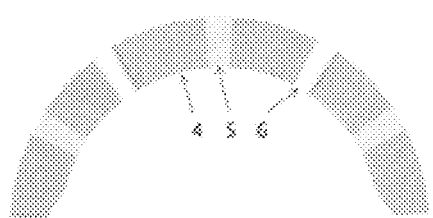
FIG. 5—a front view of the washer of this invention, comprising three assemblies of ramp and flat horizontal sections.
Figure 6:
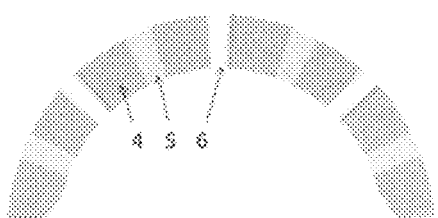
FIG. 6—a front view of the washer of this invention, comprising four assemblies of ramp and flat horizontal sections.
Figure 7:
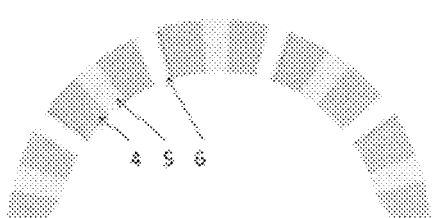
FIG. 7—a front view of the washer of this invention, comprising five assemblies of ramp and flat horizontal sections.
Figure 8:
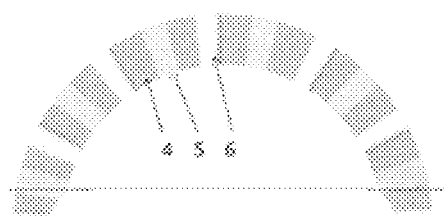
FIG. 8—a front view of the washer of this invention, comprising six assemblies of ramp and flat horizontal sections.

Thus, thrust washer 1 of this invention comprises between 2 and 10 assemblies of ramp sections 4 and flat horizontal sections 5, washer 1 comprising two, or three, or four, or five, or six, or seven, or eight, or nine, or ten assemblies of ramp sections 4 and flat horizontal sections 5 in its surface profile. Each of these assemblies comprises flat horizontal sections 5 and ramp sections 4, with symmetric or asymmetric ramps, depending on each design and application. From 11 assemblies upwards, the length of ramp sections 4 is reduced too much, which compromises the hydrodynamic support generation of washer 1. FIGS. 4 to 8 illustrate alternate preferred configurations of thrust washer 1 of this invention, comprising from 2 assemblies up to 6 assemblies of ramp sections 4 and flat horizontal sections 5:

FIG. 4 illustrates a washer 1 comprising two assemblies of ramp sections 4 and flat horizontal sections 5, and an oil channel 6;

FIG. 5 illustrates a washer 1 comprising three assemblies of ramp sections 4 and flat horizontal sections 5, and two oil channels 6;

FIG. 6 illustrates a washer 1 comprising four assemblies of ramp sections 4 and flat horizontal sections 5, and three oil channels 6;

FIG. 7 illustrates a washer 1 comprising five assemblies of ramp sections 4 and flat horizontal sections 5, and four oil channels 6;

FIG. 8 illustrates a washer 1 comprising six assemblies of ramp sections 4 and flat horizontal sections 5, and five oil channels 6.

Washer 1 comprises, furthermore, 7 assemblies, or 8 assemblies, or 9 assemblies, or 10 assemblies of ramp sections 4 and flat horizontal sections 5, which are not illustrated.

As may be seen, the length of ramp sections 4 and flat horizontal sections 5 varies in accordance with the number of assemblies provided in the surface profile of washer 1.

Thus, washer 1 of this invention has each ramp section 4 comprising a maximum angular length of 45°, each flat horizontal section 5 comprising a maximum angular length of 45°, and each oil channel 6 comprising a maximum angular length of 20°.

Furthermore, thrust washer 1 of this invention has each ramp section 4 comprising a maximum depth of 300 microns and each oil channel 6 comprising a maximum depth of 2.5 millimeters.

It is important to mention that thrust washer 1 of this invention has a surface profile such that the dimensional tolerance of the depth of ramp section 4 has less influence on the hydrodynamic support of washer 1. In the state of the art, the dimensional tolerance of the depth of ramp section 4 must be controlled since it has a direct effect on the result of hydrodynamic support and load support of the thrust washers. The variation in this tolerance in the case of washer 1 of this invention has less of an influence on these properties.

Thus this invention provides a thrust washer 1 which ensures greater hydrodynamic support, enabling washer 1 to support a greater axial load before binding.

Figure 9:
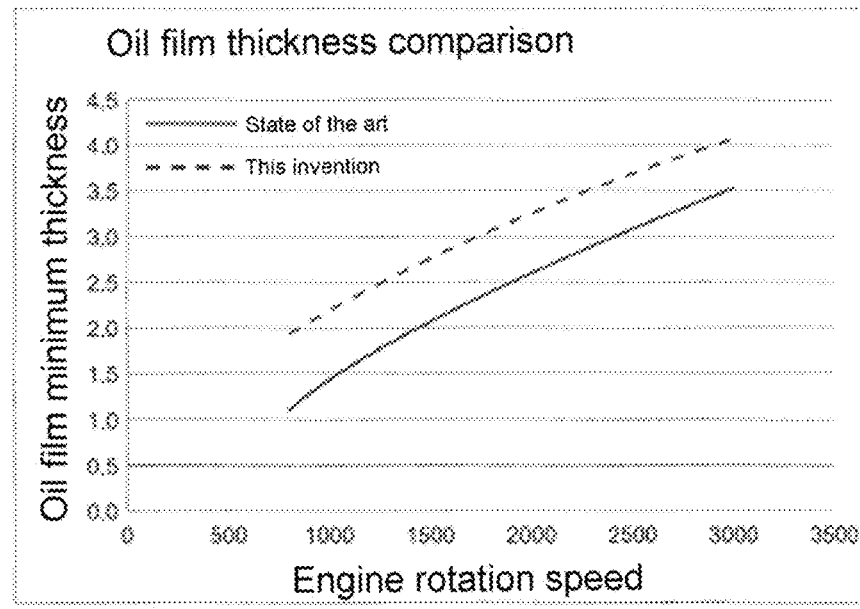
FIG. 9—a comparative graph of the oil-film thickness obtained for a prior-art thrust washer and the thrust washer of this invention.

FIG. 9 shows a comparison between oil film thicknesses obtained in the case of prior-art thrust washers having a ramp-and-pad surface profile and that of this invention. It will be noted that for an engine rotation speed of between 500 and 1000 rpm the oil film thickness obtained in the state of the art comprises values between 1 and 1.5 microns, while the washer of this invention obtains values between 1.5 and 2 microns for the oil film thickness. When engine rotation speed reaches 3000 rpm, the prior-art washer has an oil film thickness of around 3.5 microns, whereas the thrust washer of this invention is capable of maintaining an oil film thickness of 4 microns for the same rotation. Thus, it is proven that the thrust washer of this invention offers greater resistance to binding as it obtains oil film thicknesses greater than those obtained in the state of the art.

Figure 10:
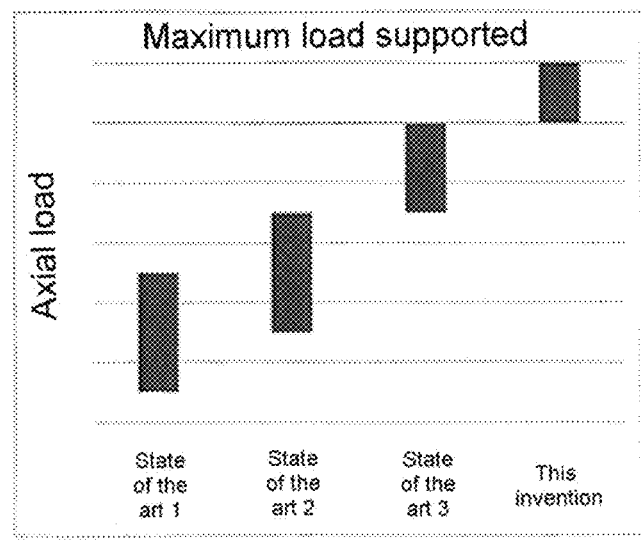
FIG. 10—a comparative graph of the maximum load supported in the case of prior-art washers and the thrust washer of this invention.

FIG. 10 shows the differences between the maximum load supported by prior-art washers and the washer of this invention:

The state of the art 1 is defined by a washer without a hydrodynamic profile, i.e. a flat washer;

The state of the art 2 is defined by a washer with a hydrodynamic profile but without flat sections, i.e. a convex washer;

The state of the art 3 is defined by a washer with a hydrodynamic ramp-and-pad profile, i.e. a washer with flat sections, curvilinear sections and oil channels, but which has points of inflection and discontinuities in the link between these sections.

As may clearly be seen, the washer of this invention is capable of supporting an axial load that is much greater than the load supported by prior-art washers 1 and 2. Furthermore, the maximum axial load supported by prior-art washer 3 corresponds to the minimum load supported by the washer of this invention. Thus, the washer of this invention has excellent resistance to binding, not only owing to the oil film thickness obtained but also owing to the maximum axial load supported, both of which are greater than those obtained in the state of the art.

Figure 11:
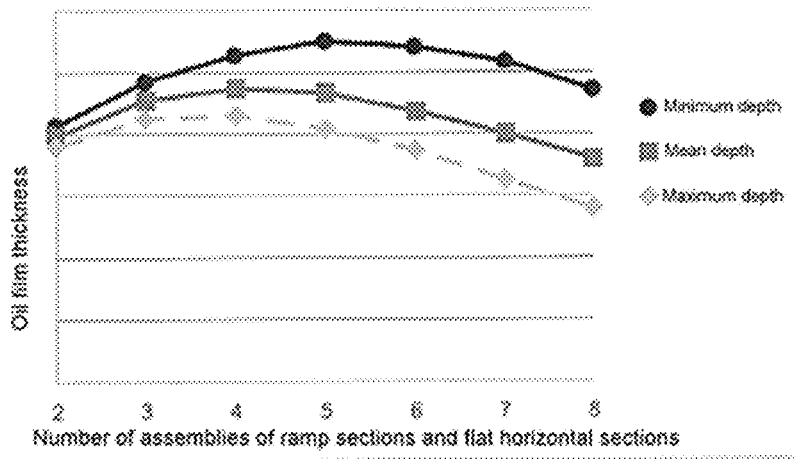
FIG. 11—a comparative graph of the effect of the number of assemblies of ramp and flat horizontal sections in the hydrodynamic support of the washer in accordance with the depth of the ramp sections.
Figure 12:
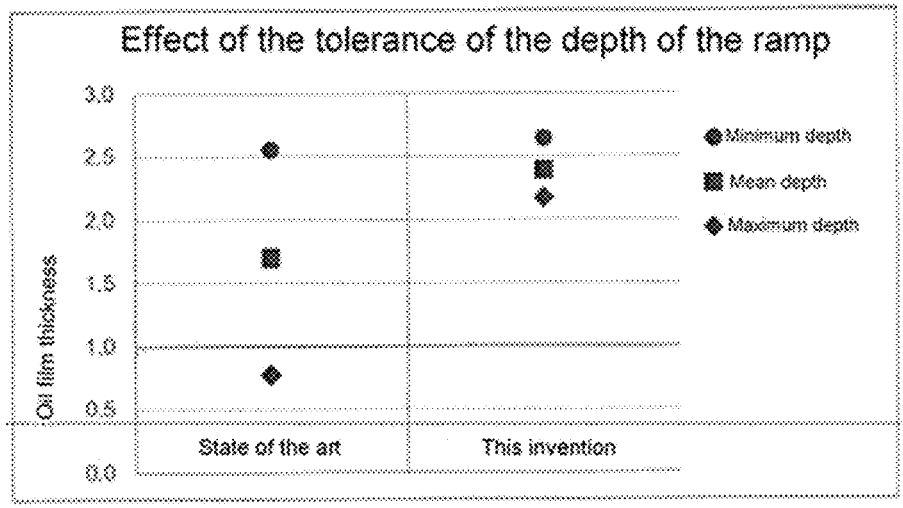
FIG. 12—a comparative graph of the effect of the tolerance of the depth of the ramp in the case of a prior-art thrust washer and the thrust washer of this invention.

FIGS. 11 and 12 demonstrate the effect of the tolerance of the depth of ramp section 4. FIG. 11 shows that the smaller the number of assemblies of ramp sections 4 and horizontal sections 5 the lesser the influence of the depth of ramp section 4, this effect being a result of the tolerance. By increasing the number of assemblies, hydrodynamic support tends to increase but the influence of the depth tolerance of ramp section 4 increases also. Above a certain number of assemblies, support tends to drop and there is likewise a continuous increase in the influence of the depth of the ramp section. In the case of the graph illustrated in FIG. 11, from five assemblies upward the hydrodynamic support of the washer tends to diminish and the influence of the depth of ramp section 4 is greater.

FIG. 12 shows the effect of the tolerance of the depth of ramp section 4 in the case of a prior-art ramp-and-pad washer and the washer of this invention. It will be seen that the washer of this invention offers less of a range of values for oil film thicknesses obtained, varying between 2 and 3 microns in thickness, whereas the prior-art washer has a greater range, varying between 0.5 and 3 microns of oil film thickness. Thus, it is proven that washer 1 of this invention offers a reduction in the influence of the tolerance of the depth of ramp section 4 and its surface profile.

Therefore, it has been proven that thrust washer 1 of this invention offers excellent hydrodynamic support and an increase in the maximum load supported, guaranteeing high resistance to binding and consequently excellent performance.

Although a preferred embodiment has been described, it should be understood that the scope of this invention covers other possible variations, being limited only by the content of the appended claims, including possible equivalents therein.

The invention claimed is:

1. A thrust washer for an internal combustion engine comprising a body having:
   a planar contact surface associated with an engine block; and
   a slip surface having a surface profile including at least one ramp section, at least one flat horizontal section, and at least one oil channel, the at least one ramp section and the at least one flat horizontal section connected via an asymptotic curve, the at least one ramp section extending asymptotically toward the at least one flat horizontal section;
   wherein the at least one ramp section has an angular length of 45° or less, the at least one flat horizontal section has an angular length of 45° or less, and the at least one oil channel has an angular length of 20° or less.

2. The washer as claimed in claim 1, wherein the at least one ramp section has a depth of 300 microns or less.

3. The washer as claimed in claim 1, wherein the at least one oil channel has a depth of 2.5 millimeters or less.

4. The washer as claimed in claim 1, further comprising at least two assemblies, wherein the at least one ramp section includes a plurality of ramp sections, the at least one flat horizontal section includes a plurality of flat horizontal sections, and each assembly of the at least two assemblies includes at least two ramp sections of the plurality of ramp sections, with at least one of symmetric ramps and asymmetric ramps, and one flat horizontal section of the plurality of flat horizontal sections.

5. The washer as claimed in claim 4, wherein the at least two assemblies includes up to ten assemblies.

6. The washer as claimed in claim 4, wherein:
   the at least one oil channel includes a plurality of oil channels, the plurality of flat horizontal sections and the plurality of oil channels alternatingly arranged along the slip surface in a circumferential direction; and
   the plurality of ramp sections are disposed along the slip surface in the circumferential direction with one of i) one of the plurality of flat horizontal sections, and ii) one of the plurality of oil channels, disposed between adjacent ramp sections of the plurality of ramp sections.

7. The washer as claimed in claim 4, wherein the at least two ramp sections are symmetric.

8. The washer as claimed in claim 4, wherein the at least two ramp sections are asymmetric.

9. An internal combustion engine, comprising at least one thrust washer including a body having:
   a planar contact surface associated with an engine block; and
   a slip surface having a surface profile including at least one ramp section, at least one flat horizontal section, and at least one oil channel, the at least one ramp section and the at least one flat horizontal section connected via an asymptotic curve, the at least one ramp section extending asymptotically toward the at least one flat horizontal section;
   wherein the at least one ramp section has an angular length of 45° or less, the at least one flat horizontal section has an angular length of 45° or less, and the at least one oil channel has an angular length of 20° or less.

10. The internal combustion engine as claimed in claim 9, wherein the at least one ramp section has a depth of 300 microns or less.

11. The internal combustion engine as claimed in claim 9, wherein the at least one oil channel has a depth of 2.5 millimeters or less.

12. The internal combustion engine as claimed in claim 9, wherein the body is shaped as a section of a circular ring.

13. The internal combustion engine as claimed in claim 9, further comprising at least two assemblies, wherein the at least one ramp section includes a plurality of ramp sections, the at least one flat horizontal section includes a plurality of flat horizontal sections, and each assembly of the at least two assemblies includes at least two ramp sections of the plurality of ramp sections, with at least one of symmetric ramps and asymmetric ramps, and one flat horizontal section of the plurality of flat horizontal sections.

14. The internal combustion engine as claimed in claim 13, wherein the at least two assemblies includes between two assemblies and ten assemblies.

15. The internal combustion engine as claimed in claim 13, wherein:
   the at least one oil channel includes a plurality of oil channels, the plurality of flat horizontal sections and the plurality of oil channels alternatingly arranged along the slip surface in a circumferential direction; and
   the plurality of ramp sections are disposed along the slip surface in the circumferential direction with one of i) one of the plurality of flat horizontal sections, and ii)

one of the plurality of oil channels, disposed between adjacent ramp sections of the plurality of ramp sections.

16. A thrust washer for an internal combustion engine comprising a body shaped as a portion of a circular ring, the body having:
   a planar contact surface associated with an engine block; and
   a radially outward facing circumferential slip surface having a surface profile including a plurality of ramp sections, a plurality of flat horizontal sections, and a plurality of oil channels;
   the plurality of ramp sections disposed along the slip surface in a circumferential direction with one of i) one of the plurality of flat horizontal sections, and ii) one of the plurality of oil channels, disposed between adjacent ramp sections of the plurality of ramp sections;
   the plurality of flat horizontal sections and the plurality of oil channels alternatingly arranged along the slip surface in the circumferential direction;
   the plurality of ramp sections and the plurality of flat horizontal sections disposed directly adjacent to one another connected via an asymptotic curve, the plurality of ramp sections extending asymptotically toward a directly adjacent flat horizontal section of the plurality of horizontal sections;
   wherein the plurality of ramp sections respectively have an angular length of 45° or less with respect to the body, the plurality of flat horizontal sections respectively have an angular length of 45° or less with respect to the body, and the plurality of oil channels respectively have an angular length of 20° or less with respect to the body.

17. The washer as claimed in claim 16, wherein the plurality of ramp sections respectively have a depth of 300 microns or less.

18. The washer as claimed in claim 16, wherein the plurality of oil channels respectively have a depth of 2.5 millimeters or less.

19. The washer as claimed in claim 16, further comprising a plurality of assemblies respectively including at least two ramp sections of the plurality of ramp sections and one of the plurality of flat horizontal sections, wherein the plurality of assemblies and the plurality of oil channels are alternatingly disposed in the circumferential direction.

20. The washer as claimed in claim 1, wherein the body is shaped as a section of a circular ring.

* * * * *